T. DE WITT.
Carriage-Spring.
No. 68,966.　　　　　　　　　　　　　　　Patented Sept. 17, 1867.
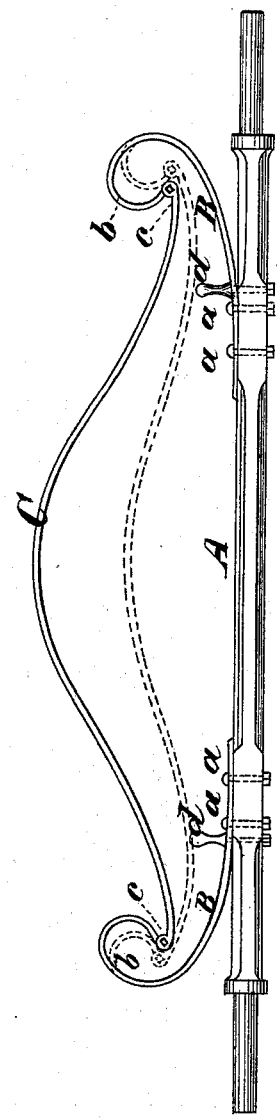
Witnesses:　　　　　　　　　　　　　　　Inventor:

UNITED STATES PATENT OFFICE.

THOMAS DE WITT, OF DETROIT, MICHIGAN.

IMPROVEMENT IN CARRIAGE-SPRINGS.

Specification forming part of Letters Patent No. 68,966, dated September 17, 1867.

*To all whom it may concern:*

Be it known that I, THOMAS DE WITT, of Detroit, in the county of Wayne and State of Michigan, have invented a new and useful Improvement in Carriage-Springs; and I do hereby declare that the following is a full, clear, and exact description thereof, which will enable others skilled in the art to make and use the same, reference being had to the accompanying drawings, and to the letters of reference marked thereon.

This invention consists in the application of fixed studs to a carriage-spring composed of two parts connected together and arranged in such a manner that a spring superior to the ordinary elliptic spring is obtained.

The accompanying drawing represents a view of my invention applied to the rear axle of a vehicle.

A is the axle; B B, the lower and C the upper part of the spring. The lower part of the spring is composed of two steel bars, the inner ends of which are firmly bolted to the axle, as shown at $a\ a$, and the outer parts curved to form nearly a complete circle, as shown at $b\ b$. These lower parts, B B, are designed to have a requisite degree of elasticity, and the upper part, C, of the spring, which is formed of one piece of steel, has its ends connected by joints $c\ c$ to the upper ends of the parts B B.

To the lower parts, B B, of the spring there are attached vertical studs $d\ d$, which serve as bearings for the upper part, C, of the spring when said part is depressed a certain distance under the weight to which it may be subjected; and it will be seen by referring to the drawing that when the upper part, C, comes in contact with the studs $d\ d$ the strength of the whole spring will be materially increased and made fully able to support the weight upon it, the upper part, C, not being allowed to descend sufficiently to meet the axle A under any reasonable weight to which it may be subjected.

The ordinary elliptic springs are very liable to become "set," as it is technically termed, when subjected to an undue weight, or a sufficient weight to cause the upper and lower parts to meet—a result which strains the fiber of the steel, destroying its elasticity, and rendering it necessary to upset the spring, retemper it, and add one or more leaves to the same. This difficulty is fully obviated by my improvement.

Having thus described my invention, I claim as new and desire to secure by Letters Patent—

A carriage-spring composed of the parts A B C, connected together and used in connection with the studs $d\ d$, arranged in relation with said parts substantially as herein shown and described.

The above specification of my invention signed by me this 5th day of July, 1867.

THOMAS DE WITT.

Witnesses:
 JOHN WARD,
 S. W. WHITING.